United States Patent [19]
Roosma et al.

[11] Patent Number: 5,581,546
[45] Date of Patent: Dec. 3, 1996

[54] APPARATUS FOR MONITORING AN ATM SYSTEM

[75] Inventors: André H. Roosma, Zoetermeer; Jacob C. Van Der Wal, Ve Delft; Wilhelmina M. Ten Wolde, The Hague, all of Netherlands

[73] Assignee: Koninklijke PTT Nederland N.V., Groningen, Netherlands

[21] Appl. No.: 388,367

[22] Filed: Feb. 14, 1995

[30] Foreign Application Priority Data

Feb. 22, 1994 [NL] Netherlands ............. 9400265

[51] Int. Cl.$^6$ ................ H04J 3/14; H04L 12/56
[52] U.S. Cl. ............. 370/253; 370/232; 370/235
[58] Field of Search ............... 370/17, 94.2, 13, 370/60.1, 61, 84, 94.1, 60, 79, 58.1–58.3; 371/20.1; 364/514, 569

[56] References Cited

U.S. PATENT DOCUMENTS

| | | | |
|---|---|---|---|
| 5,179,549 | 1/1993 | Joos et al. | 370/17 |
| 5,301,193 | 4/1994 | Toyofuku et al. | 370/94.1 |
| 5,361,253 | 11/1994 | Feijen et al. | 370/17 |
| 5,402,426 | 3/1995 | Foglar et al. | 370/94.1 |
| 5,412,642 | 5/1995 | Nunokawa | 370/94.1 |
| 5,432,713 | 7/1995 | Takeo et al. | 370/94.1 |

FOREIGN PATENT DOCUMENTS

| | | |
|---|---|---|
| 0275678A1 | 7/1988 | European Pat. Off. . |
| 0381275B1 | 8/1990 | European Pat. Off. . |
| 0450708B1 | 10/1991 | European Pat. Off. . |
| 0548995A2 | 6/1993 | European Pat. Off. . |

OTHER PUBLICATIONS

P. Boyer et al; "The Spacer–Controller: An Efficient UPC/NPC for ATM Networks"; Oct. 1992; pp. 316–320; IEICE 1992; vol. 2, International Switching Symposium.

P. Boyer et al; "Spacing Cells Protects and Enhances Utilization of ATM Networks Links"; Sep. 1992; pp. 38–49; IEEE Network.

F. Guillemin et al; "Management of Cell Delay Variation in ATM Networks"; Dec. 1992; IEEE. Globecom 1992.

*Primary Examiner*—Alpus H. Hsu
*Assistant Examiner*—Ajit Patel
*Attorney, Agent, or Firm*—Frishauf, Holtz, Goodman, Langer & Chick

[57] ABSTRACT

Apparatus for monitoring a flow of ATM cells in which a measured value is calculated in all cases. A 'leaky bucket' mechanism known for this purpose has too few degrees of freedom to be able to monitor the flow of cells accurately enough for it to be possible to deduce from cell flow variations whether a (temporary) cell rate increase is the consequence of an unavoidable variation induced by the transmission system or of an unduly high cell rate (which is in fact avoidable) on the part of the system users. The operation of the apparatus can be adjusted better to the cell flow characteristics if the measured value ($CV_n$) is a function of a previously calculated reference arrival time ($RAT_n$) and the actual arrival time ($AT_n$) of the arriving cell. The reference arrival time is, in turn, a function of the reference arrival times ($RAT_{n-p}$, $RAT_{n-q}$, ...) of one or more preceding cells (n-p, n-q, ...) and of the actual arrival times ($AT_{n-p}$, $AT_{n-q}$, ...) of that same one or more preceding cells. In formula form:

$CV_n = f_1(RAT_n, AT_n)$, where $RAT_n = f_2(RAT_{n-p}, AT_{n-p}, RAT_{n-q}, AT_{n-q}, ...)$

12 Claims, 3 Drawing Sheets

```
CELL  1: RAT  1.00 AT  0.97 ATD    -3% CV +0.03 TH +0.10 TRANSMIT
CELL  2: RAT  1.99 AT  2.22 ATD   +22% CV -0.23 TH +0.10 TRANSMIT
CELL  3: RAT  3.04 AT  2.95 ATD    -5% CV +0.09 TH +0.10 TRANSMIT
CELL  4: RAT  4.02 AT  3.97 ATD    -3% CV +0.05 TH +0.10 TRANSMIT
CELL  5: RAT  5.01 AT  4.70 ATD   -30% CV +0.31 TH +0.10 DISCARD*
CELL  6: RAT  5.01 AT  5.76 ATD   -24% CV -0.75 TH +0.10 TRANSMIT
CELL  7: RAT  6.16 AT  6.97 ATD    -3% CV -0.81 TH +0.10 TRANSMIT
CELL  8: RAT  7.32 AT  8.16 ATD   +16% CV -0.84 TH +0.10 TRANSMIT
CELL  9: RAT  8.49 AT  9.19 ATD   +19% CV -0.70 TH +0.10 TRANSMIT
CELL 10: RAT  9.63 AT 10.12 ATD   +12% CV -0.49 TH +0.10 TRANSMIT
CELL 11: RAT 10.73 AT 11.38 ATD   +38% CV -0.65 TH +0.10 TRANSMIT
CELL 12: RAT 11.86 AT 12.40 ATD   +40% CV -0.54 TH +0.10 TRANSMIT
CELL 13: RAT 12.97 AT 13.50 ATD   +50% CV -0.53 TH +0.10 TRANSMIT
CELL 14: RAT 14.07 AT 14.44 ATD   +44% CV -0.37 TH +0.10 TRANSMIT
CELL 15: RAT 15.15 AT 15.69 ATD   +69% CV -0.54 TH +0.10 TRANSMIT
CELL 16: RAT 16.26 AT 16.81 ATD   +81% CV -0.55 TH +0.10 TRANSMIT
CELL 17: RAT 17.37 AT 18.07 ATD  +107% CV -0.70 TH +0.10 TRANSMIT
CELL 18: RAT 18.51 AT 19.06 ATD  +106% CV -0.55 TH +0.10 TRANSMIT
CELL 19: RAT 19.62 AT 19.99 ATD   +99% CV -0.37 TH +0.10 TRANSMIT
CELL 20: RAT 20.69 AT 20.97 ATD   +97% CV -0.28 TH +0.10 TRANSMIT
CELL 21: RAT 21.75 AT 21.99 ATD   +99% CV -0.24 TH +0.10 TRANSMIT
CELL 22: RAT 22.80 AT 22.86 ATD   +86% CV -0.06 TH +0.10 TRANSMIT
CELL 23: RAT 23.81 AT 23.81 ATD   +81% CV -0.00 TH +0.10 TRANSMIT
CELL 24: RAT 24.81 AT 24.68 ATD   +68% CV +0.13 TH +0.10 DISCARD*
CELL 25: RAT 24.81 AT 25.75 ATD   +75% CV -0.94 TH +0.10 TRANSMIT
CELL 26: RAT 26.00 AT 26.85 ATD   +85% CV -0.85 TH +0.10 TRANSMIT
CELL 27: RAT 27.17 AT 27.86 ATD   +86% CV -0.69 TH +0.10 TRANSMIT
CELL 28: RAT 28.31 AT 28.85 ATD   +85% CV -0.54 TH +0.10 TRANSMIT
CELL 29: RAT 29.42 AT 30.00 ATD  +100% CV -0.58 TH +0.10 TRANSMIT
CELL 30: RAT 30.53 AT 30.90 ATD   +90% CV -0.37 TH +0.10 TRANSMIT
CELL 31: RAT 31.61 AT 31.97 ATD   +97% CV -0.36 TH +0.10 TRANSMIT
CELL 32: RAT 32.68 AT 32.70 ATD   +70% CV -0.02 TH +0.10 TRANSMIT
CELL 33: RAT 33.68 AT 33.72 ATD   +72% CV -0.04 TH +0.10 TRANSMIT
CELL 34: RAT 34.69 AT 34.86 ATD   +86% CV -0.17 TH +0.10 TRANSMIT
CELL 35: RAT 35.72 AT 35.85 ATD   +85% CV -0.13 TH +0.10 TRANSMIT
CELL 36: RAT 36.75 AT 36.93 ATD   +93% CV -0.18 TH +0.10 TRANSMIT
CELL 37: RAT 37.79 AT 38.01 ATD  +101% CV -0.22 TH +0.10 TRANSMIT
CELL 38: RAT 38.83 AT 38.82 ATD   +82% CV +0.01 TH +0.10 TRANSMIT
CELL 39: RAT 39.83 AT 39.61 ATD   +61% CV +0.22 TH +0.10 DISCARD*
CELL 40: RAT 39.83 AT 40.77 ATD   +77% CV -0.94 TH +0.10 TRANSMIT
CELL 41: RAT 41.02 AT 42.04 ATD  +104% CV -1.02 TH +0.10 TRANSMIT
CELL 42: RAT 42.22 AT 42.91 ATD   +91% CV -0.69 TH +0.10 TRANSMIT
CELL 43: RAT 43.36 AT 44.17 ATD  +117% CV -0.81 TH +0.10 TRANSMIT
CELL 44: RAT 44.52 AT 45.14 ATD  +114% CV -0.62 TH +0.10 TRANSMIT
CELL 45: RAT 45.64 AT 45.89 ATD   +89% CV -0.25 TH +0.10 TRANSMIT
CELL 46: RAT 46.69 AT 46.91 ATD   +91% CV -0.22 TH +0.10 TRANSMIT
CELL 47: RAT 47.74 AT 47.82 ATD   +82% CV -0.08 TH +0.10 TRANSMIT
CELL 48: RAT 48.75 AT 49.04 ATD  +104% CV -0.29 TH +0.10 TRANSMIT
CELL 49: RAT 49.81 AT 49.78 ATD   +78% CV +0.03 TH +0.10 TRANSMIT
CELL 50: RAT 50.80 AT 50.63 ATD   +63% CV +0.17 TH +0.10 DISCARD*
```

\* TOTALLY DISCARDED 4 CELLS (8%)

CALCULATING CV BASED ON CELL ARRIVAL TIMES
RAT=REFERENCE ARRIVAL TIME; AT=ARRIVAL TIME;
ATD=ARRIVAL TIME DEVIATION; CV=CONTROL VALUE; TH=THRESHOLD

FIG. 2

```
CELL  1: RAI 1.00 AI 0.97 AID  -3% CV +0.03 TH +0.10 TRANSMIT
CELL  2: RAI 1.02 AI 1.25 AID +25% CV -0.23 TH +0.10 TRANSMIT
CELL  3: RAI 0.82 AI 0.73 AID -27% CV +0.09 TH +0.10 TRANSMIT
CELL  4: RAI 1.07 AI 1.02 AID  +2% CV +0.05 TH +0.10 TRANSMIT
CELL  5: RAI 1.04 AI 0.73 AID -27% CV +0.31 TH +0.10 DISCARD*
CELL  6: RAI 1.04 AI 1.79 AID +79% CV -0.75 TH +0.10 TRANSMIT
CELL  7: RAI 0.40 AI 1.21 AID +21% CV -0.81 TH +0.10 TRANSMIT
CELL  8: RAI 0.35 AI 1.19 AID +19% CV -0.84 TH +0.10 TRANSMIT
CELL  9: RAI 0.33 AI 1.03 AID  +3% CV -0.70 TH +0.10 TRANSMIT
CELL 10: RAI 0.44 AI 0.93 AID  -7% CV -0.49 TH +0.10 TRANSMIT
CELL 11: RAI 0.61 AI 1.26 AID +26% CV -0.65 TH +0.10 TRANSMIT
CELL 12: RAI 0.48 AI 1.02 AID  +2% CV -0.54 TH +0.10 TRANSMIT
CELL 13: RAI 0.57 AI 1.10 AID +10% CV -0.53 TH +0.10 TRANSMIT
CELL 14: RAI 0.57 AI 0.94 AID  -6% CV -0.37 TH +0.10 TRANSMIT
CELL 15: RAI 0.71 AI 1.25 AID +25% CV -0.54 TH +0.10 TRANSMIT
CELL 16: RAI 0.57 AI 1.12 AID +12% CV -0.55 TH +0.10 TRANSMIT
CELL 17: RAI 0.56 AI 1.26 AID +26% CV -0.70 TH +0.10 TRANSMIT
CELL 18: RAI 0.44 AI 0.99 AID  -1% CV -0.55 TH +0.10 TRANSMIT
CELL 19: RAI 0.56 AI 0.93 AID  -7% CV -0.37 TH +0.10 TRANSMIT
CELL 20: RAI 0.70 AI 0.98 AID  -2% CV -0.28 TH +0.10 TRANSMIT
CELL 21: RAI 0.78 AI 1.02 AID  +2% CV -0.24 TH +0.10 TRANSMIT
CELL 22: RAI 0.81 AI 0.87 AID -13% CV -0.06 TH +0.10 TRANSMIT
CELL 23: RAI 0.95 AI 0.95 AID  -5% CV -0.00 TH +0.10 TRANSMIT
CELL 24: RAI 1.00 AI 0.87 AID -13% CV +0.13 TH +0.10 DISCARD*
CELL 25: RAI 1.00 AI 1.94 AID +94% CV -0.94 TH +0.10 TRANSMIT
CELL 26: RAI 0.25 AI 1.10 AID +10% CV -0.85 TH +0.10 TRANSMIT
CELL 27: RAI 0.32 AI 1.01 AID  +1% CV -0.69 TH +0.10 TRANSMIT
CELL 28: RAI 0.45 AI 0.99 AID  -1% CV -0.54 TH +0.10 TRANSMIT
CELL 29: RAI 0.57 AI 1.15 AID +15% CV -0.58 TH +0.10 TRANSMIT
CELL 30: RAI 0.53 AI 0.90 AID -10% CV -0.37 TH +0.10 TRANSMIT
CELL 31: RAI 0.71 AI 1.07 AID  +7% CV -0.36 TH +0.10 TRANSMIT
CELL 32: RAI 0.71 AI 0.73 AID -27% CV -0.02 TH +0.10 TRANSMIT
CELL 33: RAI 0.98 AI 1.02 AID  +2% CV -0.04 TH +0.10 TRANSMIT
CELL 34: RAI 0.97 AI 1.14 AID +14% CV -0.17 TH +0.10 TRANSMIT
CELL 35: RAI 0.86 AI 0.99 AID  -1% CV -0.13 TH +0.10 TRANSMIT
CELL 36: RAI 0.90 AI 1.08 AID  +8% CV -0.18 TH +0.10 TRANSMIT
CELL 37: RAI 0.86 AI 1.08 AID  +8% CV -0.22 TH +0.10 TRANSMIT
CELL 38: RAI 0.82 AI 0.81 AID -19% CV +0.01 TH +0.10 TRANSMIT
CELL 39: RAI 1.01 AI 0.79 AID -21% CV +0.22 TH +0.10 DISCARD*
CELL 40: RAI 1.01 AI 1.95 AID +95% CV -0.94 TH +0.10 TRANSMIT
CELL 41: RAI 0.25 AI 1.27 AID +27% CV -1.02 TH +0.10 TRANSMIT
CELL 42: RAI 0.18 AI 0.87 AID -13% CV -0.69 TH +0.10 TRANSMIT
CELL 43: RAI 0.45 AI 1.26 AID +26% CV -0.81 TH +0.10 TRANSMIT
CELL 44: RAI 0.35 AI 0.97 AID  -3% CV -0.62 TH +0.10 TRANSMIT
CELL 45: RAI 0.50 AI 0.75 AID -25% CV -0.25 TH +0.10 TRANSMIT
CELL 46: RAI 0.80 AI 1.02 AID  +2% CV -0.22 TH +0.10 TRANSMIT
CELL 47: RAI 0.83 AI 0.91 AID  -9% CV -0.08 TH +0.10 TRANSMIT
CELL 48: RAI 0.93 AI 1.22 AID +22% CV -0.29 TH +0.10 TRANSMIT
CELL 49: RAI 0.77 AI 0.74 AID -26% CV +0.03 TH +0.10 TRANSMIT
CELL 50: RAI 1.02 AI 0.85 AID -15% CV +0.17 TH +0.10 DISCARD*
```

\* TOTALLY DISCARDED 4 CELLS (8%)

FIG. 3

CALCULATING CV BASED ON CELL ARRIVAL INTERVALS
RAI=REFERENCE ARRIVAL INTERVAL; AI=ARRIVAL INTERVAL; AID=ARRIVAL INTERVAL DEVIATION; CV=CONTROL VALUE; TH=THRESHOLD

ID_546

APPARATUS FOR MONITORING AN ATM SYSTEM

BACKGROUND OF THE INVENTION

The invention relates to an apparatus for determining a measured value during the arrival of an ATM cell which forms part of an ATM cell flow in an ATM system. Such an apparatus is disclosed, inter alia, in European Patent Application EP-381 275 in the name of the Applicant. This is used to protect an ATM system against impermissible transgressions of the nominal (maximum) cell rates assigned to the cell flows (virtual channels) provided. The known apparatus makes use of a so-called 'leaky bucket' mechanism. A problem which occurs in the transmission of ATM cells is that, as a consequence of the individual manipulability thereof, the cells may have a fairly large variation in arrival time (cell delay variation). Insofar as this variation is a consequence of manipulations in the transmission system itself (such as in switches and buffers) (see, inter alia, European Patent Application EP-450 708 in the name of the Applicant), this must not result in the cells being rejected. On the other hand, cell series which do (substantially) exceed the cell rate through the fault of the users are in fact refused further transmission (or, for example, marked as in European Patent 0 275 678 in the name of AT&T). The said 'leaky bucket' mechanism has too few degrees of freedom to monitor the cell flow accurately enough for it to be possible to deduce with a reasonable probability from the measured value obtained whether a (temporary) cell rate increase is the consequence of an unavoidable variation induced by the transmission system or the consequence of an unduly high cell rate (which is in fact avoidable) on the part of the system users.

SUMMARY OF THE INVENTION

The object of the invention is therefore to provide an improved apparatus for determining a measured value during the arrival of an ATM cell which forms part of an ATM cell flow in an ATM system, which apparatus is characterized in its generality in that the measured value ($CV_n$) is a function of a reference arrival time ($RAT_n$) assigned to said arriving cell and the actual arrival time ($AT_n$) of said cell, which reference arrival time ($RAT_n$) is a function of the reference arrival time ($RAT_{n-p}$) of at least one preceding cell and of the actual arrival time ($AT_{n-p}$) of said same at least one preceding cell, these features expressed as a formula being:

$$CV_n = f_1(RAT_n, AT_n),$$

$$\text{where } RAT_n = f_2(RAT_{n-p}, AT_{n-p}, \ldots)$$

In this way, only the reference arrival time ($RAT_{n-p}$) and the actual arrival time ($AT_{n-p}$) of a preceding cell (or, possibly, a plurality of preceding cells, for example, the cells n–1 to n–5) need to be temporarily stored in a buffer in all cases, while all the actual arrival times of the entire cell flow nevertheless exerts an influence on the reference arrival time of the last cell to arrive and, consequently, on the required measured value, since each reference arrival time is calculated from a preceding actual arrival time and a preceding reference arrival time; said preceding reference arrival time is calculated from an actual arrival time and a reference arrival time situated in front thereof, etc. The reference arrival time serves, as it were, as transfer medium for propagating the influence of the past (actual) arrival times up to the present. In general, as is stated above, the parameters which regulate the influence of the past arrival times on the most recent reference arrival time will be chosen so that the arrival times of old cells have less influence on the most recent reference arrival time than the younger cells.

In fact, it is not important whether the said arrival times are expressed in absolute values, for example related to one and the same starting value (T=0) or whether they are expressed in mutually related interval times.

If the arrival times are expressed in absolute values, a more detailed elaboration of the invention is preferably characterized in that the measured value ($CV_n$) is proportional to the difference between the reference arrival time ($RAT_n$) and the actual arrival time ($AT_n$) of the arriving cell, and the reference arrival time ($RAT_n$) is proportional to the reference arrival time ($RAT_{n-p}$) of a preceding cell and proportional to the actual arrival time ($AT_{n-p}$) of that same preceding cell and is multiplied by the inverse value (T) of a nominal cell rate assigned to the ATM cell flow, these features expressed as a formula being:

$CV_n = C_1*(RAT_n - AT_n)$, where $RAT_n = C_2*RAT_{n-p} + C_3*AT_{n-p} + T$, where $C_1$, $C_2$ and $C_3$ are proportionality factors.

If the arrival times are expressed in mutually related values, a more detailed elaboration of the invention is preferably characterized in that the measured value ($CV_n$) is proportional to the difference between the reference arrival time ($RAT_n$) and the actual arrival time ($AT_n$) of the arriving cell, and the reference arrival time ($RAT_n$) is proportional to the measured value ($CV_{n-p}$) of a preceding cell and is multiplied by the inverse value (T) of a nominal cell rate assigned to the ATM cell flow, these features expressed as a formula being:

$CV_n = C_1*(RAT_n - AT_n)$, where $RAT_n = C_2*CV_{n-p} + T$, where $C_1$ and $C_2$ are proportionality factors.

In both cases, the (absolute or relative) reference arrival time of a cell are determined from the reference arrival time and the actual arrival time of a preceding cell (for example the last cell (p=1)). Since the reference time of the preceding cell was again also determined from a preceding cell (etc., etc.) it is now possible to arrange for the 'arrival-time history' of the cell flow to play a pan in assessing the behaviour of the cell flow and conclusions can be drawn therefrom regarding the cause of (shorter or longer) transgressions of the nominal cell rate. The degree to which older and younger preceding cells exert an influence on the most recent reference arrival time is determined by the proportionality factors $C_2$ and $C_3$. It is also possible to arrange for said factors $C_2$ and $C_3$ to vary automatically under the influence of, for example, the average arrival time deviation or other variables derived from the behaviour of the cell flow. For example, in this way, a change in behaviour detected at a certain instant in the cell flow can be investigated more accurately by altering the detection parameters, proportionality factors $C_2$ and $C_3$, after detecting said change in behaviour; it is therefore possible to 'zoom in', as it were, on said change in behaviour, as a result of which a more accurate conclusion can be drawn with regard to its cause.

BRIEF DESCRIPTION OF THE DRAWINGS

FIG. 2 shows a listing explaining calculating CV based on cell arrival times, where RAT=Reference Arrival Time;

AT=Arrival Time; ATD=Arrival Time Deviation; CV=Control Value; and TH=Threshold; and FIG. 3 shows a listing explaining calculating CV based on cell arrival intervals, where RAI=Reference Arrival Interval; AI=Arrival Interval; AID=Arrival Interval Deviation; CV=Control Value; and TH=Threshold.

DETAILED DESCRIPTION

Figure 1:
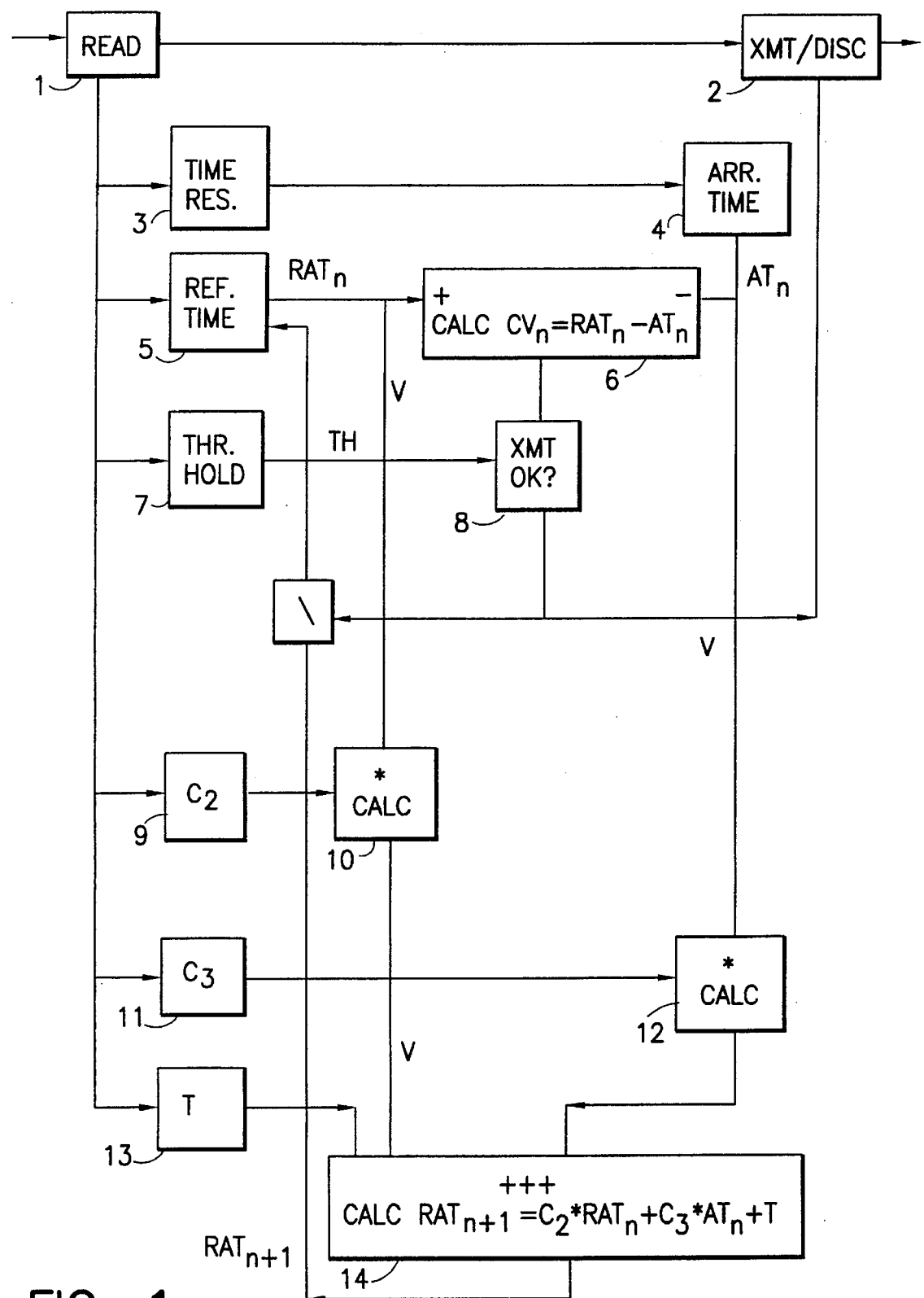
FIG. 1 shows diagrammatically an exemplary embodiment of a measuring and monitoring apparatus according to the invention, in which the method of the invention is implemented. Use is made of the absolute arrival times.

The measuring and monitoring apparatus shown in FIG. 1 comprises a read-out device 1, a switching device 2, six memory devices 3, 5, 7, 9, 11 and 13, a time-indicating device 4 and a processor comprising four calculating devices 6, 10, 12, 14 and a comparison device 8.

At an input A of the measuring and monitoring apparatus, there arrive sequentially data cells which comprise a control word group and an information word group. Located at that point is the read-out device 1 which derives the channel number from the control word group. The data cell itself is passed to the switching device 2, where the data cell is temporarily stored until a decision is taken about whether or not to pass said data cell to output B of the switching device 2, to which a downstream transmission network (not shown) is connected.

The channel number derived by 1 serves as an index with which the memory devices 3, 5, 7, 9, 11, 13 deliver the parameters and variables which are specific to the channel concerned. The first memory device 3 provides an indication of the resolution with which the time has to be determined by the time-indicating device 4. The second memory device 5 delivers an indication of the reference time of the data cell with the respective channel number as calculated after expiry of the preceding data cell having that same channel number. The first calculating device 6 then determines what the difference is between the instant of arrival a(n) of the last data cell to arrive and the instant of reference c(n) valid for said cell. In the case of measurements, the measured value thus obtained can be outputted for storage, for example together with the channel designation of the cell.

The reference time is then determined as follows for the subsequent data cell with the respective channel number. A first constant value $C_2$ is supplied by the fourth memory device 9. In the second calculating device 10, said value is multiplied by the reference time $RAT_n$ previously retrieved from the memory device 5. The fifth memory device 11 supplies a second constant value $C_3$. In the third calculating device 12, this value is multiplied by the arrival time $AT_n$ previously obtained from the time-indicating device 4. The sixth memory device 13 supplies a third constant factor T. This value is summed in the fourth calculating device 14 with both the result from calculating device 10 and with that from 12. The result of 14 is the reference time $RAT_{n+1}$ for the subsequent data cell having the same channel number.

The comparison device 8 compares the measured value obtained from calculating device 6 with a threshold value TH supplied by the third memory device 7.

If the comparison device concludes that the result is less than (or equal to) the threshold value, the following actions are taken:

(a) The switching device 2 is instructed to pass the respective data cell (via its output B) to the downstream transmission network.

(b) The value obtained from calculating device 14 for the reference time for the subsequent data cell having the same channel number is written into the second memory device 5, the old value in said memory device being overwritten.

If the comparison device concludes that the result is greater than the threshold value, the following actions are carried out:

(a) The switching device 2 is instructed not to pass the respective data cell to the downstream transmission network. In many implementations of networks, it is required in such a case that the vacated position is replaced by a certain bit pattern which indicates, for example, a blank data cell; the switching device 2 then transmits (via its output B) said bit pattern instead of the respective data cell.

(b) The value obtained from calculating device 14 for the reference time is not written into the second memory device 5 so that the old value is retained in said memory device.

During initialization of the apparatus, or of a transmission channel, the memory devices 3, 5, 7, 9, 11, 13 are filled from the control system (not shown) with parameters specific to the various channel numbers, along with the initial values (starting values) for the variable in the second memory device 5. For this purpose, the memory devices are provided with an adjustment facility which gives the control system access to the memory means without interfering with the actual operation of the measuring and monitoring apparatus.

If the method is used solely as a measuring instrument and not as a monitoring apparatus, the switching device 2, the third memory device 7, the comparison device 8 and the control system for preventing the storage of the calculated instant of reference in memory device 5 can be omitted.

FIGS. 2 and 3 show the result of a simple simulation of the invention for a series of 50 cells which enter the apparatus sequentially. The programs used to generate these results are shown by Algorithms 1 and 2; the program shown in Algorithm 1 makes use of the absolute values of the arrival times, indicated by AT (arrival time) and RAT (reference arrival time); the program structure corresponds to the structure of the exemplary hardware embodiment in FIG. 1. The program shown in Algorithm 2 makes use of the detected arrival times with respect to one another, indicated by AI (arrival interval) and RAI (reference arrival interval). Although the intermediate results are different, the final results are identical. An exemplary hardware embodiment such as that in FIG. 1 can be assembled without great effort from the structure of the program shown in Algorithm 2, but making use in that case of arrival time intervals.

```
100 C1=1:C2=.8:C3=.2:                           REM C#=Proportion Parameters
110 OPEN "CELL.STR" FOR INPUT AS#1
120 OPEN "CV.OUT" FOR OUTPUT AS#2
130 PRINT#2,"* Calculating CV based an Cell Arrival Times *"
140 T=1:RAT=1:                                   REM T=1/nominal cell rate;
                                                 RAT=Reference Arrival Time (Initial)
150 FOR CN=1 TO 50:                              REM CN=Cell Number
160 INPUT#1,AT:                                  REM AT=Arrival Time
170 CV=C1*(RAT-AT):                              REM CV=Control Value
```

```
180 TH=.1:                                              REM TH=CV-ThresHold
190 IF CV<TH THEN XM$="Transmit":ELSE XM$="DISCARD*":DC=DC+1:
                                                 REM DC=Number of Discarded Cells
200 PRINT#2,USING" Cell ##: RAT ##.##; AT ##.##; ATD+###% CV +#.##;
TH +#.##: &";CN;RAT;AT;(AT−CN)*100;CV;TH;.XMS;CN
210 IF XM$="Transmit" THEN RAT=C2*RAT+C3*AT+T:
                                                 REM Computing new RAT value
220 NEXT CN
230 PRINT#2,USING"* Totally discarded ## cells (##%)";DC;DC*100/CN
240 CLOSE
   ALGORITHM 1 CV Calculating Program using Absolute Arrival Time Values
100 C1=1:C2=.8:                                  REM C#=Proportion Parameters
110 OPEN "CELL.STR" FOR INPUT AS#1
120 OPEN "CV.OUT" FOR OUTPUT AS#2
130 PRINT#2,"* Calculating CV based on Cell Arrival Intervals *"
140 T=1:RAI=1:PAT=0:
                                                 REM T=1/nominal cell rate;
                                        RAI=Reference Arrival Interval (initial);
                                         PAT=Previous Arrival Time (initial)
150 FOR CN=1 TO 50;                              REM CN=Cell Number
160 INPUT#1,AT: AI=AT-PAT:               REM AT=Arrival Time; AI=Arrival Interval
170 CV=C1*(RAI−AI):                              REM CV=Control Value
180 TH=.1:                                       REM TH=CV-ThresHold
190 IF CV<TH THEN XM$="Transmit":ELSE XM$="DISCARD*":DC=DC+1:
                                                 REM DC=Discarded Cells
200 PRIXT#2,USING"Cell ##: RAI ##.##; AI ##.##; AID+###% CV +#.##; TH
+#.##: &";CN;RAI;AI;(AI−1)*100;CV;TH;XMS;CN
210 IF XM$="Transmit" THEN RAI=C2*CV+T:PAT=AT:
                                 REM Computing new RAI value: Set New PAT=Present AT
220 NEXT CN
230 PRINT#2,USING"* Totally discarded ## cells (##%)";DC;DC*100/CN
240 CLOSE
   ALGORITHM 2 CV Calculating Program using Arrival Intervals (Relative
Arrival Times)
```

We claim:

1. A method of transferring a data stream fed to a transmission network comprising a plurality of transmission channels, said data stream comprised of data cells which each include a control word group having a channel designation indicating a transmission channel via which each said data cell has to be transferred, and an information word group, said method comprising the steps of:

determining an actual arrival time ($AT_{n-p}$) of at least one preceding data cell, assigning a reference arrival time ($RAT_n$) to each arriving data cell which is a function of the reference arrival time ($RAT_{n-p}$) of said at least one preceding data cell and the actual arrival time ($AT_{n-p}$) of said at least one preceding data cell, determining a control value which is a function of the reference arrival time ($RAT_n$) of an arriving data cell (n) and the actual arrival time ($AT_n$) of said arriving data cell, expressed as follows:

$CV_n = f_1(RAT_n, AT_n)$, where $RAT_n = f_2(RAT_{n-p}, AT_{n-p} \ldots)$, and transferring said data stream to the transmission network in dependence on said control value.

2. A method according to claim 1, wherein said control value is equal to a difference between the reference arrival time ($RAT_n$) of the arriving data cell (n) and the actual arrival time ($AT_n$) of said arriving data cell, expressed as follows:

$CV_n = RAT_n - AT_n$.

3. A method according to claim 1, wherein:

all of the times are expressed in absolute values, the control value ($CV_n$) is proportional to a difference between the reference arrival time ($RAT_n$) of the arriving data cell and the actual arrival time ($AT_n$) of the arriving data cell, the reference arrival time ($RAT_n$) of the arriving data cell is proportional to the reference arrival time ($RAT_{n-p}$) of a preceding cell and is proportional to the actual arrival time ($AT_{n-p}$) of said preceding cell, and said step of determining a control value includes the step of multiplying the reference arrival time ($RAT_n$) of said arriving data cell by an inverse value (T) of a nominal cell rate assigned to the data cell flow, and expressed as follows:

$CV_n = C_1 * (RAT_n - AT_n)$, where $RAT_n = C_2 * RAT_{n-p} + C_3 * AT_{n-p} + T$, where $C_1$, $C_2$ and $C_3$ are proportionality factors.

4. A method according to claim 3, wherein at least one of said proportionality factors ($C_1, C_2, C_3$) is a function one of:

(a) the reference arrival time of at least one cell, and (b) the actual arrival time of at least one cell.

5. A method according to claim 1, wherein:

all of the times are expressed in mutually related interval values, the control value ($CV_n$) is proportional to a difference between the reference arrival time ($RAT_n$) of the arriving data cell and the actual arrival time ($AT_n$) of the arriving data cell, the reference arrival time ($RAT_n$) of the arriving data cell is proportional to the control value ($CV_{n-p}$) of a preceding cell, and said step of determining a control value includes the step of multiplying the reference arrival time ($RAT_n$) of said arriving data cell by an inverse value (T) of a nominal cell rate assigned to the data cell flow, and expressed as follows:

$CV_n = C_1 * (RAT_n - AT_n)$, where $RAT_n = C_2 * CV_{n-p} + T$, where $C_1$ and $C_2$ are proportionality factors.

6. A method according to claim 5, wherein at least one of said proportionality factors ($C_1, C_2, C_3$) is a function one of:

(a) the reference arrival time of at least one cell, and (b) the actual arrival time of at least one cell.

7. Apparatus for transferring a data stream fed to a transmission network including a plurality of transmission channels, said data stream comprised of data cells which each include a control word group having a channel designation indicating a transmission channel via which each said data cell has to be transferred, and an information word group, said apparatus comprising:

means for determining an actual arrival time ($AT_{n-p}$) of at least one preceding data cell, means for assigning a reference arrival time ($RAT_n$) to each arriving data cell which is a function of the reference arrival time ($RAT_{n-p}$) of said at least one preceding data cell and the actual arrival time ($AT_{n-p}$) of said at least one preceding data cell, means for determining a control value which is a function of the reference arrival time ($RAT_n$) of an arriving data cell (n) and the actual arrival time ($AT_n$) of said arriving data cell, expressed as follows:

$CV_n = f_1(RAT_n, AT_n)$, where $RAT_n = f_2(RAT_{n-p}, AT_{n-p} \ldots)$, and means transferring said data stream to the transmission network in dependence on said control value.

8. Apparatus according to claim 7, wherein said control value is equal to a difference between the reference arrival time ($RAT_n$) of the arriving data cell (n) and the actual arrival time ($AT_n$) of said arriving data cell, expressed as follows:

$CV_n = RAT_n - AT_n$.

9. Apparatus according to claim 7, wherein:

all of the times are expressed in absolute values, the control value ($CV_n$) is proportional to a difference between the reference arrival time ($RAT_n$) of the arriving data cell and the actual arrival time ($AT_n$) of the arriving data cell, the reference arrival time ($RAT_n$) of the arriving data cell is proportional to the reference arrival time ($RAT_{n-p}$) of a preceding cell and is proportional to the actual arrival time ($AT_{n-p}$) of said preceding cell, and said means for determining a control value includes means for multiplying the reference arrival time ($RAT_n$) of said arriving data cell by an inverse value (T) of a nominal cell rate assigned to the data cell flow, as follows:

$CV_n = C_1 * (RAT_n - AT_n)$, where $RAT_n = C_2 * RAT_{n-p} + C_3 * AT_{n-p} + T$, where $C_1$, $C_2$ and $C_3$ are proportionality factors.

10. Apparatus according to claim 9, wherein at least one of said proportionality factors ($C_1$, $C_2$, $C_3$) is a function one of:

(a) the reference arrival time of at least one cell, and (b) the actual arrival time of at least one cell.

11. Apparatus according to claim 7, wherein:

all of the times are expressed in mutually related interval values, the control value ($CV_n$) is proportional to a difference between the reference arrival time ($RAT_n$) of the arriving data cell and the actual arrival time ($AT_n$) of the arriving data cell, the reference arrival time ($RAT_n$) of the arriving data cell is proportional to the control value ($CV_{n-p}$) of a preceding cell, and said step of determining a control value includes the step of multiplying the reference arrival time ($RAT_n$) of said arriving data cell by an inverse value (T) of a nominal cell rate assigned to the data cell flow, and expressed as follows:

$CV_n = C_1 * (RAT_n - AT_n)$, where $RAT_n = C_2 * CV_{n-p} + T$, where $C_1$ and $C_2$ are proportionality factors.

12. Apparatus according to claim 11, wherein at least one of said proportionality factors ($C_1$, $C_2$, $C_3$) is a function one of:

(a) the reference arrival time of at least one cell, and (b) the actual arrival time of at least one cell.

\* \* \* \* \*